United States Patent

[11] 3,615,266

[72] Inventor Paul C. Donohue
Wilmington, Del.
[21] Appl. No. 15,888
[22] Filed Mar. 2, 1970
[45] Patented Oct. 26, 1971
[73] Assignee E. I. du Pont de Nemours and Company
Wilmington, Del.

[54] SILICON CHALCOGENIDES
11 Claims, No Drawings

[52] U.S. Cl. .......... 23/315, 23/204 R, 252/62.3 S
[51] Int. Cl. .......... C01b 33/00, B01j 17/00, C04b 35/00
[50] Field of Search .......... 23/315, 134, 204 R; 252/62.3 S; 250/205, 206; 148/1.6

[56] References Cited
UNITED STATES PATENTS
3,321,326 5/1967 Young .......... 23/134

*Primary Examiner*—Oscar R. Vertiz
*Assistant Examiner*—Hoke S. Miller
*Attorney*—James H. Ryan ABSTRACT: Binary, ternary and quaternary silicon chalcogenides of the formula $$Si_mS_xSe_yTe_z$$

wherein $m$ is $9.3\pm0.3$, $x+y+z=4$, $x$ is to 0 to 3.2, and $y$ and $z$ are 0 to 4, having a crystal structure of cubic symmetry when the chalcogen is Se or S/Se and a closely related crystal structure of pseudocubic symmetry when one of the chalcogens is Te. Process for the preparation of the above chalcogenides comprising heating for at least about 15 minutes at about 800° C. to 1600° C. and at least about 30 to 65 kilobars pressure the elementary components, mono- and dichalcogenides of silicon, and the binary and ternary chalcogenides of this invention. The dichalcogenides of this invention are useful as semiconductors and in detecting heat and infrared radiation.

SILICON CHALCOGENIDES

BACKGROUND OF THE INVENTION

1. Field of the Invention

This invention relates to new silicon chalcogenides and their preparation.

2. Description of the Prior Art

Binary sulfides, selenides and tellurides of silicon, e.g., SiTe, $SiS_2$, $SiSe_2$ and $SiTe_2$ containing one atom of silicon per one or two atoms of chalcogen have been described in the literature. With the exception of a new tetragonal, high-pressure form of $SiS_2$ recently prepared by H. S. Young, U.S. Pat. No. 3,321,326, and perhaps the little known SiTe, the silicon chalcogenides of the art, are hydrolytically unstable and hence of limited utility, though stable in dry air.

SUMMARY OF THE INVENTION

According to the present invention there are provided novel silicon chalcogenides of the formula $$Si_mS_xSe_yTe_z$$

wherein $m$ is 9.3±0.3, $x+y+z=4$, $x$ is 0 to 3.2, $y$ and $z$ are 0 to 4, these chalcogenides having a crystal structure of cubic symmetry when the chalcogen is Se or S/Se and a closely related crystal structure of pseudocubic symmetry when one of the chalcogens is Te.

Further, according to the present invention there is provided a process for the preparation of the above chalcogenides comprising heating for at least about 15 minutes at about 800°–1,600° C. and about 30–65 kilobars pressure in the approximate proportions required to give the desired stoichiometry, combinations of reactants selected from the group consisting of elementary silicon, elementary sulfur, elementary selenium, elementary tellurium, monochalcogenides of silicon, dichalcogenides of silicon, and the binary and ternary silicon chalcogenides of this invention.

DESCRIPTION OF THE PREFERRED EMBODIMENTS

The present invention provides new crystalline silicon chalcogenides, useful as semiconductors and photoconductors, which contain more atoms of silicon than chalcogen in the unit cell and which exhibit surprising hydrolytic stability, resisting even concentrated hydrochloric acid.

These new silicon chalcogenides comprise silicon chemically combined with at least one chalcogen of the group S, Se, and Te, wherein the atomic ratio of chalcogen to silicon is 0.430±0.014, said chalcogenides containing at most 0.355 atom of S per atom of Si, and having a crystal structure of cubic symmetry when the chalcogen is Se or S/Se and a closely related crystal structure of pseudocubic symmetry when one of the chalcogens is tellurium. The products may also be described as binary, ternary, and quaternary silicon chalcogenides of the formula $$Si_mS_xSe_yTe_z$$

wherein $m$ is 9.3±0.3, $x+y+z=4$, $x$ is 0 to 3.2, and $y$ and $z$ are 0 to 4. Preferred compositions have the formula $$Si_{9.5}S_xSe_yTe_z$$

wherein $x$, $y$, and $z$ are as defined above.

Deviation from exact stoichiometry frequently occurs in chalcogenides—see, for example, Wadsley's chapter in Mandelcorn, "Non-Stoichiometric Compounds," Academic Press, New York (1964), pp. 98–209. The formulas assigned to the products of this invention are based on density measurements, X-ray studies with space group considerations, and chemical analyses. Of these methods, chemical analysis is considered to be the least reliable due to difficulty in completely removing unreacted starting material and in determining chalcogen when more than one of these elements is present.

As is well known, the relationship between density and molecular weight for crystals of cubic symmetry is:

$$1.6604\ (M.W.)/a^3 = \text{density}$$

where $M.W.$ is the formula weight of the unit cell and $a$ is the unit cell dimension in Angstrom units. Thus, for the product of example 1, below, which had measured density and cubic cell dimension of 3.620 g./cm.$^3$ and 10.229 A., respectively, the formula weight of the unit cell is calculated to be 2,333.6. Analytical data show an atomic ratio of Si to Se of approximately 1.56/0.65, and space group considerations show that the number of silicon and selenium atoms in the cell must each be an even whole number. Hence, the unit cell formula weight of 2,333.6 corresponds approximately to $Si_{38}Se_{16}$ or to a formula unit of $Si_{9.5}Se_4$. The density calculated for a unit cell of four $Si_{9.5}Se_4$ formula units with $a$=10.229 A. is 3.616 g./cm.$^3$ which is close to the measured 3.620 g./cm.$^3$. Similar calculations for example 2 show a silicon/selenium atomic ratio of approximately 1.51/ 0.698 and a calculated unit cell molecular weight based on measured density and X-ray data of 2,337.7, corresponding to $Si_{38.25}Se_{16}$ or to four formula units of $Si_{9.5}Se_4$. Theoretical density calculated for a unit cell of four $Si_{9.5}Se_4$ formula units in which $a$=10.235 A. is 3.607 g./cm.$^3$ as compared to the measured 3.62 g./cm.$^3$. The atomic ratio of selenium to silicon is:

| | From Density and X-Ray Data | From Analytical Data |
|---|---|---|
| Example 1 | 0.420 | 0.417 |
| Example 2 | 0.418 | 0.463 |

In contrast to cubic silicon selenide and cubic silicon sulfide-selenide, silicon telluride has pseudocubic symmetry requiring monoclinic indexing in which $c_{monoclinic} = a_{cubic}$ and $a_{monoclinic} \approx b_{monoclinic} \approx \sqrt{2}a_{cubic}$. From determinations of density, X-ray studies with space group considerations, and chemical analysis, the following relationships were found for the silicon tellurides of examples 5, 6, and 7 (table I):

TABLE I

| Example No. | Unit cell molecular weight [1] | Formula unit [2] | Density: Observed | Density: Calc. for $Si_{9.5}Te_4$ [3] | Atomic ratio of tellurium to silicon: Calc. from density and X-ray data | Atomic ratio of tellurium to silicon: Calc. from analytical data |
|---|---|---|---|---|---|---|
| 5 | 6117.89 | $Si_{9.055}Te_4$ | 4.432 | 4.504 | 0.442 | |
| 6 | 6130.80 | $Si_{9.11}Te_4$ | 4.440 | 4.502 | 0.439 | 0.406 |
| 7 | 6132.78 | $Si_{9.12}Te_4$ | 4.440 | 4.501 | 0.4385 | 0.403 |

[1] Calculated from density and X-ray data, taking analytical data into consideration.
[2] One-eighth unit cell molecular weight.
[3] Based on measured cell dimension.

It cannot be predicted to what extent the presence or absence of one or two extra silicon atoms in the unit cell would affect the cell constants. The crystal structure is probably made up of a covalent framework of silicon atoms as is elementary silicon itself. In such case, atoms unnecessary to the framework would probably cause relatively little change in size by their presence. In any event, density measurements are remarkably consistent.

The silicon selenides and the silicon sulfide-selenides of this invention have cubic crystal symmetry with cubic cell dimensions of 10.20±0.03 A. In contrast, the silicon tellurides, silicon sulfide-tellurides, and the silicon sulfide-selenide-tellurides possess pseudocubic crystal symmetry requiring monoclinic indexing in which $a$=14.72±0.12 A., $b$=14.61±0.18 A., $c$=10.39±0.08 A., and $\beta$=90.31°±0.07, or on the basis of a pseudocubic unit cell, $a$=10.37±0.09 A. 0.09

The silicon chalcogenides of this invention may be prepared by heating for at least about 15 minutes (2 hours usually suffices to complete the reaction, however, longer reaction times may also be employed) at about 800°–1,600° C. and at about 30–65 kilobars (kb.) pressure, in the approximate proportions required to give the desired stoichiometry, combinations of reactants selected from elementary silicon, elementary sulfur, elementary selenium, elementary tellurium, monochalcogenides of silicon, dichalcogenides of silicon, and the binary and ternary products of this invention. These reactions can be represented as:

$Si+Se$ and/or $Te \rightarrow Si_m(Se,Te)_4$ $Si+S+Se+Te \rightarrow Si_m(S,Se,Te)_4$ Si+ one or more silicon monochalcogenides→$Si_m(S,Se,Te)_4$ Si+ one or more silicon dichalcogenides→ $Si_m(S,Se,Te)_4$ $Si_mSe_4+Si_mTe_4 \rightarrow Si_m(Se,Te)_4$ $Si_m(Se,Te)_4+SiS_2 \rightarrow Si_m(S,Se,Te)_4$ where $m$ and the limiting sulfur content are as defined earlier.

While the reactants may be employed in the exact porportions desired in the final composition, it is preferred to use an excess, e.g., 4–50 percent by weight, of chalcogens, which melt at a relatively low temperature and provide a more fluid reaction mixture conducive to formation of crystals. Formation of crystals may also be promoted by prolonging the period at 800°–1,000° C. when reaction is effected at this temperature or, in case of higher reaction temperature, by cooling over a period of several hours to about 800°–1,100° C. prior to quenching to room temperature. Quenching to approximately room temperature is preferred, though not essential, since it is helpful in maintaining the phase stable at high temperature. Protracted periods at high temperature are not essential and, if desired, the temperature of the reaction mixture may be dropped abruptly to room temperature, e.g., in a few minutes, soon after reaching maximum temperature. Pressure is maintained during the period at elevated temperature and, for convenience, is normally maintained until the charge reaches room temperature.

Temperature and pressure are interrelated. At 800°–1,000° C. pressures of 30–45 kb. usually suffice, whereas at 1,000° C. and above pressures of 45–65 kb. or higher are preferred.

Ordinary, commercially available forms of silicon, sulfur, selenium, and tellurium may be employed as reactants. Due to difficulty in purifying the products, high purity reactants are preferred, e.g., 99.999 percent silicon needles and 99.999 percent sulfur powder, both available from Electron Space Products, Inc. and 99.999+ percent grades of selenium and tellurium obtainable from the American Smelting and Refining Company.

Reactants for subsequent reaction at high pressure, e.g., in the tetrahedral anvil press, are usually pulverized and intimately mixed, e.g., by grinding them together using an agate mortar and pestle or by other appropriate means, and then compressed into pellets at about 40 tons/sq.in. pressure employing a conventional pellet press.

The high pressures and temperatures necessary in these reactions may be obtained using a tetrahedral anvil pressure device as described by E. C. Lloyd, et al., Jour. of Research, National Bureau of Standards 63C, 59 (1959). In the device, the prepelleted reactants were placed in a boron nitride container which fitted into a graphite sleeve that served as a resistance heater. This assembly was enclosed in a pyrophyllite tetrahedron and placed in the anvil device, capable of generating pressures in excess of 65 kb.

Four of the calibration points, taken at room temperature, used to determine pressure developed in this device appear in the 1963 Edition of the American Institute of Physics Handbook, pp. 4–43, as follows:

Bismuth I→II 25.37±0.02 kb.
Bismuth II→III 26.96±0.18 kb.
Thallium II→III 36.69±0.11 kb.
Barium II→III 59.0±1.0 kb.

All compressions were made on the cold assembly, and the charges were then heated to the desired temperature using an appropriate thermocouple. No pressure correction for thermocouple behavior has been introduced; standard EMF tables for 1 atmosphere were used. The temperatures were measured at the central surface of the boron nitride crucible. The temperature at the ends of the crucible was probably several hundred degrees cooler.

The silicon chalcogenides are obtained as a single phase or with discrete portions of the reaction product visually distinct from unreacted starting material and byproducts. Segregation is probably the result of a temperature gradient within the reaction mass, for the ends of the pellet may be 100°–200° C. lower in temperature than the center portion. This usually results in the formation of crystals of the product at the ends of the pellet and congregation of byproducts in the center portion. This distribution permits manual separation of the silicon chalcogenides from impurities. Further purification may sometimes be achieved by washing with 6–12N hydrochloric acid which, when silicon dichalcogenides are present as byproducts, results in the evolution of hydrogen chalcogenide and formation of colloidal silica that may be easily washed out. Impurities such as uncombined silicon, selenium, and tellurium, while not detectable microscopically, and seldom by X-ray methods, may persist in small quantity making analytical data less reliable than density and Debye-Scherrer X-ray data.

Dependent upon reaction conditions, the products of the invention may be obtained as small crystals or in the form of dark-colored, rodlike single crystals with lengths ranging up to about 2 mm.

Unless otherwise described, it is to be understood in the examples that follow that all parts and percentages are by weight and that reaction products were separated from the boron nitride crucible, crushed to a limited extent, and separated manually from byproducts as completely as possible. Hydrochloric acid (6–12 normal) was then added (in more than one increment if necessary) until evolution of volatile hydrogen chalcogenide, formed by reaction with byproduct silicon dichalcogenide, ceased. The undissolved residue, consisting largely of $Si_{9.5}(S,Se,Te)_4$, was washed with water, frequently followed by acetone, and dried in air. The dry product was examined microscopically, and the best crystals were selected under the microscope for X-ray examination and other characterization tests.

Pressure was maintained in the tetrahedral anvil device during reaction, the intermediate cooling stage, if any, and quenching.

EXAMPLE 1

$Si_{9.5}Se_4$

A pellet weighing 0.4333 g. was made from a mixture of 0.7896 g. of Se and 0.5617 g. of Si in which the atomic ratio of Si:Se was 2:1. It was pressured to 65 kb. and reacted at 1,200° C. for 2 hours, cooled over a 2-hour period to 1,100° C., and quenched while maintaining the pressure. The product was composed of black shiny crystals at the ends of the pellet and black-gray material in the center. The pellet was washed in 6N HCl, and bubbles of $H_2Se$ were evolved. The crystals themselves were stable in hydrochloric acid. The Debye-Scherrer X-ray diffraction pattern of the crystals showed a pattern which could be indexed on the basis of a cubic unit cell dimension, $a$=10.229±0.003 A. (table II). The density of the crystals was measured: Found, 3.620 g./cm.$^3$; calculated for 4($Si_{9.5}Se_4$), 3.616 g./cm.$^3$. Differential thermal analysis showed that the crystals decomposed at 627° C. By microchemical analysis the crystals consisted of 43.86% Si and 51.41% Se, i.e., an atomic ratio of Se:Si of 0.417. The space group of the crystals was determined by single crystal analysis using Buerger precession camera methods, and three space groups were found to be possible: I23, $I2_13$, or Im3. The electrical resistivity of an individual crystal was measured. The material showed semiconducting behavior with a room temperature resistivity of $10^{10}$ ohm-cm. and Ea≈0.8 ev. The material also showed a small degree of photoconductivity; R dark/R light≈20.

TABLE II

Powder Diffraction Pattern of $Si_{9.5}Se_4$ (I = intensity of X-ray line relative to intensity of strongest line taken as 100; D = lattice line spacing)

| I | *h* | k | l | D (Obs) |
|---|---|---|---|---|
| 5 | 2 | 0 | 0 | 5.12934 |
| 30 | 2 | 1 | 1 | 4.17933 |
| 60 | 3 | 1 | 0 | 3.23786 |
| 80 | 2 | 2 | 2 | 2.95402 |
| 100 | 3 | 2 | 1 | 2.73465 |
| 60 | 4 | 0 | 0 | 2.55903 |
| 20 | 3 | 3 | 0 | 2.41050 |
| 50 | 4 | 2 | 0 | 2.28797 |
| 10 | 3 | 3 | 2 | 2.17772 |
| 10 | 5 | 1 | 0 | 2.00748 |
| 20 | 5 | 2 | 1 | 1.86714 |
| 40 | 4 | 4 | 0 | 1.80856 |
| 80 | 5 | 3 | 0 | 1.75469 |
| 40 | 6 | 0 | 0 | 1.70546 |
| 90 | 6 | 1 | 1 | 1.65980 |
| 20 | 6 | 2 | 0 | 1.61825 |
| 20 | 6 | 2 | 2 | 1.54203 |
| 10 | 6 | 3 | 1 | 1.50855 |
| 10 | 4 | 4 | 4 | 1.47662 |
| 10 | 7 | 1 | 0 | 1.44746 |
| 5 | 6 | 4 | 0 | 1.42002 |
| 30 | 7 | 2 | 1 | 1.39290 |
| 20 | 6 | 5 | 1 | 1.29966 |
| 2 | 8 | 0 | 0 | 1.27732 |
| 5 | 8 | 1 | 1 | 1.25976 |
| 10 | 8 | 2 | 0 | 1.24077 |
| 5 | 6 | 5 | 3 | 1.22284 |
| 10 | 6 | 6 | 0 | 1.20602 |
| 10 | 7 | 5 | 0 | 1.18969 |
| 10 | 6 | 6 | 2 | 1.17395 |
| 10 | 7 | 5 | 2 | 1.15848 |
| 10 | 8 | 4 | 0 | 1.14358 |
| 10 | 9 | 1 | 0 | 1.13020 |
| 5 | 8 | 4 | 2 | 1.11722 |
| 15 | 9 | 2 | 1 | 1.10352 |
| 10 | 9 | 3 | 0 | 1.07903 |
| 5 | 9 | 3 | 2 | 1.05530 |
| 10 | 8 | 4 | 4 | 1.04422 |
| 10 | 7 | 7 | 0 | 1.03391 |
| 10 | 10 | 0 | 0 | 1.02419 |
| 2 | 10 | 1 | 1 | 1.01326 |
| 2 | 10 | 2 | 0 | 1.00333 |
| 5 | 9 | 5 | 0 | 0.99447 |
| 5 | 10 | 2 | 2 | 0.98523 |
| 5 | 10 | 3 | 1 | 0.97598 |
| 5 | 8 | 7 | 1 | 0.95898 |
| 5 | 10 | 4 | 0 | 0.95029 |
| 10 | 9 | 6 | 1 | 0.94247 |
| 5 | 11 | 1 | 0 | 0.92732 |
| 5 | 11 | 2 | 1 | 0.91197 |
| 2 | 8 | 8 | 0 | 0.90486 |
| 5 | 11 | 3 | 0 | 0.89778 |
| 10 | 11 | 3 | 2 | 0.88398 |
| 5 | 11 | 4 | 1 | 0.87130 |
| 10 | 10 | 6 | 2 | 0.86489 |
| 5 | 12 | 0 | 0 | 0.85291 |
| 2 | 11 | 5 | 0 | 0.84710 |
| 5 | 10 | 7 | 1 | 0.83576 |
| 5 | 11 | 6 | 1 | 0.81423 |
| 5 | 10 | 8 | 0 | 0.79929 |
| 5 | 9 | 9 | 2 | 0.79446 |
| 10 | 13 | 2 | 1 | 0.77597 |

EXAMPLE 2

$Si_{9.5}Se_4$

A pellet weighing 0.4052 g. was made from a mixture of 0.4737 g. of Se and 0.2808 g. of Si. It was cold-pressured to 65 kb. and reacted at 1,300° C. for 2 hours, cooled over a period of 3 hours to 1,000° C., and quenched. Black shiny crystals were formed at the ends of the pellet, some measuring 2 mm. in length. The crystals were washed with hydrochloric acid to remove $SiSe_2$. The Debye-Scherrer pattern was similar to that of example 1, and the cubic unit cell was refined by least squares technique to $a$=10.235±0.003 A. The density measured on single crystals was 3.62 g./cm.$^3$; calculated for $4(Si_{9.5}Se_4)$, 3.607 g./cm.$^3$. Analysis of the crystals was: Found: 55.14% Se, 42.34% Si. Atomic ratio of Se:Si=0.463; calculated for $Si_{9.5}Se_4$: 54.20% Se, 45.79% Si. It is believed that the density and X-ray data are more reliable indicators of true stoichiometry than the actual analytical data. Electrical resistivity measurements were made on an individual crystal as before, and semiconducting behavior was observed: $\rho_{298° K.}=2\times10^9$ ohm-cm., Ea=1.0 ev. Photoelectric behavior was not observed.

EXAMPLE 3

$Si_{9.5}Se_4$

A pellet weighing 0.3942 g., made from a mixture of 0.7896 g. of Se and 0.560 g. of Si, was pressured to 45 kb. and reacted at 1,200° C., 45 kb. for 1 hour, cooled during 1 hour to 1,000° C., and quenched. The product contained black shiny crystals at the ends of the pellet and black-gray material in the center. The Debye-Scherrer pattern of the 6N HCl-washed crystals showed the same cubic pattern found for the previous examples.

EXAMPLE 4

$Si_{9.5}Se_4$

A pellet weighing 0.4038 g. was made from a mixture of 0.7896 g. of Se and 0.5617 g. of Si. It was pressured to 30 kb. and reacted at 1,000° C. for 2 hours, and quenched. The product was washed with 1:1 concentrated $HCl:H_2O$ to remove byproducts, and a dark material remained. The Debye-Scherrer pattern of the material showed the same cubic phase of $Si_{9.5}Se_4$ and some excess Si.

EXAMPLE 5

$Si_{9.5}Te_4$

A pellet weighing 0.5266 g. made from a mixture of 1.5312 g. of Te and 0.5617 g. of Si, was pressured to 65 kb. and reacted at 1,400° C. for 2 hours, cooled for 3 hours to 1,100° C., and quenched. The product contained black crystalline regions at the ends of the pellet and a black-gray material in the center which were separated manually. The Debye-Scherrer pattern of the crystals was similar in some respects to that found in the case of the selenide. It could be indexed on the basis of a pseudocubic unit cell with $a$=10.461 A. Guinier data showed line splitting requiring a monoclinic indexing: $a$=14.831 A., $b$=14.775 A., $c$=10.460 A., $\beta$=90.29° (table III). Single crystal determination of the space group showed the possibilities Cc or C2/c, both requiring the formula to be a multiple of 4. The density measured on the single crystals was 4.432 g./cm.$^3$ ; calculated for $8(Si_{9.5}Te_4)$, 4.50 g./cm.$^3$. By differential thermal analysis, the crystals were stable up to 755° C. in air. Electrical measurements made on an individual crystal showed semiconducting behavior. The material had a room temperature resistivity of 400 ohm-cm. and an activation energy Ea≈0.33 ev.

TABLE III

Powder Diffraction Pattern of $Si_{9.5}Te_4$

| I | *h* | k | l | D (Obs) | D (Calc) |
|---|---|---|---|---|---|
| 15 | −1 | 1 | 1 | 7.40303 | 7.41241 |
| 10 | −2 | 2 | 0 | 5.23323 | 5.23360 |
| 40 | −1 | 3 | 0 | 4.67728 | 4.67408 |
| 45 | −2 | 0 | 2 | 4.27877 | 4.28436 |
| 60 | 1 | 3 | 1 | 4.26575 | 4.26478 |
| 20 | −2 | 2 | 2 | 3.70510 | 3.70620 |
| 20 | 2 | 2 | 2 | 3.69217 | 3.69261 |
| 40 | −1 | 1 | 3 | 3.31094 | 3.31153 |
| 25 | 1 | 1 | 3 | 3.30366 | 3.30425 |
| 40 | −4 | 0 | 2 | 3.03143 | 3.03213 |
| 70 | 0 | 4 | 2 | 3.01682 | 3.01714 |
| 50 | −2 | 2 | 3 | 2.90636 | 2.90657 |
| 40 | 2 | 2 | 3 | 2.89623 | 2.89673 |
| 90 | −3 | 1 | 3 | 2.80307 | 2.80432 |
| 100 | −1 | 5 | 1 | 2.79367 | 2.79359 |

TABLE III–Continued

Powder Diffraction Pattern of $Si_{9.5}Te_4$

| I | h | k | l | D (Obs) | D (Calc) |
|---|---|---|---|---|---|
| 40 | 0 | 0 | 4 | 2.61543 | 2.61492 |
| 15 | −1 | 5 | 2 | 2.53591 | 2.53599 |
| 70 | −3 | 3 | 3 | 2.47062 | 2.47080 |
| 75 | 0 | 6 | 0 | 2.46294 | 2.46254 |
| 30 | −4 | 4 | 2 | 2.34319 | 2.34365 |
| 30 | 4 | 4 | 2 | 2.33632 | 2.33677 |
| 30 | −3 | 5 | 2 | 2.28444 | 2.28459 |
| 30 | 5 | 3 | 2 | 2.28109 | 2.28145 |
| 10 | 0 | 4 | 4 | 2.13431 | 2.13426 |
| 10 | −7 | 1 | 1 | 2.05814 | 2.05833 |
| 10 | −4 | 6 | 0 | 2.05152 | 2.05131 |
| 10 | −6 | 3 | 2 | 2.03841 | 2.03845 |
| 20 | −5 | 5 | 2 | 1.94577 | 1.94599 |
| 25 | 1 | 5 | 4 | 1.94061 | 1.94046 |
| 10 | −7 | 3 | 1 | 1.91495 | 1.91503 |
| 10 | 1 | 3 | 5 | 1.90835 | 1.90826 |
| 30 | −8 | 0 | 0 | 1.85364 | 1.85383 |
| 30 | 4 | 4 | 4 | 1.84625 | 1.84631 |
| 45 | −8 | 2 | 0 | 1.79815 | 1.79808 |
| 50 | 1 | 7 | 3 | 1.79182 | 1.79182 |
| 5 | 2 | 8 | 1 | 1.76632 | 1.76604 |
| 20 | −8 | 0 | 2 | 1.75043 | 1.75018 |
| 45 | −2 | 6 | 4 | 1.74403 | 1.74395 |
| 25 | 6 | 2 | 4 | 1.74117 | 1.74116 |
| 5 | −6 | 6 | 1 | 1.72150 | 1.72179 |
| 45 | −8 | 2 | 2 | 1.70315 | 1.70304 |
| 70 | −1 | 5 | 5 | 1.69703 | 1.69702 |
| 65 | 1 | 5 | 5 | 1.69527 | 1.69538 |
| 10 | −6 | 6 | 2 | 1.65661 | 1.65672 |
| 10 | $\bar{2}$ | $\bar{2}$ | 6 | 1.65231 | 1.65212 |
| 2 | −1 | 3 | 6 | 1.63435 | 1.63425 |
| 5 | −6 | 4 | 4 | 1.61887 | 1.61881 |
| 10 | −8 | 4 | 2 | 1.58172 | 1.58162 |
| 15 | 4 | 1 | 6 | 1.56546 | 1.56558 |
| 15 | 1 | 9 | 2 | 1.55743 | 1.55742 |
| 5 | 3 | 9 | 1 | 1.54075 | 1.54066 |
| 10 | −8 | 0 | 4 | 1.51669 | 1.51607 |
| 20 | 0 | 8 | 4 | 1.50844 | 1.50857 |
| 10 | −5 | 5 | 5 | 1.48251 | 1.48248 |
| 10 | 0 | 10 | 0 | 1.47753 | 1.47752 |
| 5 | −4 | 4 | 6 | 1.45333 | 1.45329 |
| 5 | 4 | 4 | 6 | 1.44845 | 1.44837 |
| 10 | −7 | 5 | 4 | 1.44077 | 1.44088 |
| 15 | −7 | 7 | 2 | 1.43901 | 1.43910 |
| 15 | 3 | 5 | 6 | 1.43493 | 1.43489 |
| 15 | −10 | 0 | 2 | 1.42874 | 1.42876 |
| 20 | −8 | 6 | 2 | 1.42639 | 1.42658 |
| 40 | 0 | 6 | 6 | 1.42302 | 1.42284 |
| 25 | 6 | 0 | 6 | 1.42117 | 1.42113 |
| 10 | −3 | 10 | 1 | 1.40320 | 1.40313 |
| 10 | −4 | 8 | 4 | 1.39871 | 1.39880 |
| 10 | 6 | 2 | 6 | 1.39550 | 1.39555 |
| 10 | 7 | 1 | 6 | 1.33729 | 1.33722 |
| 15 | 3 | 4 | 7 | 1.33214 | 1.33216 |
| 15 | −5 | 7 | 5 | 1.33062 | 1.33044 |
| 20 | −11 | 2 | 0 | 1.32634 | 1.32633 |
| 10 | −11 | 3 | 1 | 1.29132 | 1.29126 |
| 5 | −3 | 5 | 7 | 1.28885 | 1.28895 |
| 20 | −6 | 5 | 6 | 1.28580 | 1.28583 |

I = intensity of X-ray line relative to intensity of strongest line taken as 100.
D = lattice line spacing.

EXAMPLE 6

$Si_{9.5}Te_4$

A pellet weighing 0.5327 g. was pressed from a mixture of 0.7656 g. of Te and 0.2808 g. of Si, pressured to 65 kb. and reacted at 1,300° C. for 2 hours, cooled over a period of 3 hours to 1,000° C. and quenched. The product contained black crystals at the ends of the pellet which were manually separated and washed with concentrated hydrochloric acid. Guinier camera data were taken of the crystals, and the monoclinic unit cell was refined by least squares technique to the values $a$=14.834 A., $b$=14.779 A., $c$=10.457 A., $\beta$=90.27°. The density measured by displacement technique in bromoform was 4.44 g./cm.$^3$. Chemical analysis of the black crystals showed a silicon content of 35.16 percent and a tellurium content of 64.48 percent. The density calculated for $8(Si_{9.5}Te_4)$=4.502 g./cm.$^3$. The atomic ratio of Te/Si=0.4036 by analysis.

EXAMPLE 7

$Si_{9.5}Te_4$

A pellet weighing 0.5277 g. made from 0.7632 g. of Te and 0.2808 g. of Si was pressured to 65 kb. and reacted at 1,300° C. for 2 hours, cooled over a period of 2 hours to 1,000° C. and quenched. Large crystals found at the ends of the pellet were washed in 6N hydrochloric acid and in soapy water. The center portion of the pellet was discarded. The large crystals gave a Debye-Scherrer pattern similar to that of the products of examples 5 and 6. The density of an individual crystal was 4.44 g./cm.$^3$. Monoclinic unit cell dimensions were found to be: $a$=14.830 A., $b$=14.785 A., $c$=10.460 A., $\beta$=90.24°. The density calculated for $8(Si_{9.5}Te_4)$ is 4.50 g./cm.$^3$. The results of chemical analysis were: Found, 64.01% Te, 34.68% Si, atomic ratio of Te:Si, 0.406; calculated for $Si_{9.5}Te_4$: 65.67% Te, 34.32% Si, atomic ratio of Te:Si, 0.421.

EXAMPLE 8

$Si_{9.5}Te_4$

A pellet weighing 0.5052 g. was prepared from a mixture of 0.638 g. of Te and 0.281 g. of Si. It was pressured to 30 kb. and reacted at 1,200° C. for 1 hour, cooled during 2 hours to 900° C., and quenched. The produce was composed of black shiny crystalline end regions that were separated manually and a gray center region. The Debye-Scherrer pattern of the crystals showed the presence of $Si_{9.5}Te_4$ phase and excess Si.

EXAMPLE 9

$Si_{9.5}Te_4$

A pellet weighing 0.5367 g. was made from a mixture of 1.531 g. of Te and 0.530 g. of Si. It was pressured to 45 kb. and reacted at 1,100° C. for 1 hour, cooled for 2 hours to 900° C., and quenched. The product was a homogeneous microcrystalline black material which, with no purification or manual separation, showed a Debye-Scherrer pattern having, predominantly, reflections of the phase $Si_{9.5}Te_4$ with some unidentified additional lines.

EXAMPLE 10

$Si_{9.5}(Se, Te)_4$

A pellet weighing 0.4455 g. was made from a mixture of 0.561 g. of Si, 0.638 g. of Te, and 0.395 g. of Se. It was pressured to 65 kb. and reacted at 1,200° C. for 2 hours, cooled for 2 hours to 1,000° C., and quenched. The product contained crystalline regions at the ends of the pellet and a black-gray region in the center. The entire lightly crushed pellet was treated with 6N HCl, dried, and the crystals were then separated. The Debye-Scherrer pattern of the crystals showed similarity to those of the binary compounds and was indexed on the basis of a monoclinic unit cell: $a$=14.612 A., $b$=14.440 A., $c$=10.316 A., $\beta$=90.37°, or a pseudocubic cell, $a$=10.301 A., By analysis, the crystals consisted of 39.65% Si, 23.99% Se, and 35.18% Te, totaling 98.82%. This corresponds to a composition of $Si_{9.5}Se_{2.04}Te_{1.85}$ or $Si_{9.75}Se_{2.1}Te_{1.9}$. The resistivity of a single crystal was measured. The material showed semiconducting behavior with a room temperature resistivity of $2\times10^8$ ohm-cm., Ea=0.7 ev. It was photoconductive with a resistance in the dark to resistance in light ratio of more than 100 and appeared to be most sensitive to visible light.

EXAMPLE 11

$Si_{9.5}Se_{1.44}Te_{2.56}$

A pellet weighing 0.5142 g. was pressed from a mixture of 0.1184 g. of Se, 0.5742 g. of Te, and 0.2808 g. of Si. It was pressured to 65 kb. and reacted at 1,200° C. for 2 hours, and quenched. The product contained a shiny silvery crystalline end region, which was separated manually. This end region gave a Debye-Scherrer pattern which could be indexed on the basis of a pseudocubic cell, $a$=10.380 A. By assuming the applicability of Vegard's rule, the composition is $Si_{9.5}Se_{1.44}Te_{2.56}$.

EXAMPLE 12

$Si_{9.5}Se_{3.6}Te_{0.4}$

A pellet weighing 0.4505 g. was pressed from a mixture of 0 3553 g. of Se, 0.1914 g. of Te, and 0.2808 g. of Si. It was pressured to 65 kb. and reacted at 1,200° C. for 2 hours, and quenched. Mechanically separated silvery crystals formed at the end region of the pellet gave a Debye-Scherrer pattern which could be indexed on the basis of a pseudocubic unit cell, $a$=10.257 A. Assuming the applicability of Vegard's rule, the composition of the phase is $Si_{9.5}Se_{3.6}Te_{0.4}$.

EXAMPLE 13

$Si_{9.5}Si_{1.68}Se_{2.32}$

A pellet weighing 0.3443 g. was made from a mixture of 0.5616 g. of Si, 0.4737 g. of Se, and 0.1684 g. of S. It was pressured to 65 kb. and reacted at 1,200° C. for 2 hours, cooled over a period of 2 hours to 1,000° C., and quenched. The product was washed with 12N HCl to remove volatile and easily suspended impurities. The center region of the pellet consisted of dark red crystals which showed a Debye-Scherrer pattern having a cubic unit cell, $a$=10.173 Density measured on the crystals was 3.15 g./cm.$^3$. Assuming the formula $Si_{9.5}S_xSe_{1-x}$, the value of $x$=1.68 and hence the formula $Si_{9.5}S_{1.68}Se_{2.32}$ may be calculated from the density. Electrical measurements made on a single crystal showed semiconducting behavior. The room temperature resistivity was $4\times10^{12}$ ohm-cm. and Ea=0.7 ev.

EXAMPLE 14

$Si_{9.5}S_{1.4}Se_{2.6}$

A pellet weighing 0.3421 g. was made from a mixture of Si, Se, and S mixed in the atomic ratio 2:0.5:0.5, respectively. The pellet was pressured to 65 kb. and reacted at 1,100° C. for 1 hour, cooled over a 3-hour period to 800° C., and quenched. The product was purified by washing with 1:1 concentrated $HCl:H_2O$, leaving black crystalline and black glassy material. The Debye-Scherrer patterns of both materials were taken and identified. The black crystals showed the pattern of Si; the black glassy phase showed a pattern similar to $Si_{9.5}Se_4$ but shifted in size. The pattern was indexed on the basis of a cubic unit cell with $a$=10.182 A. From the composition and measured cell dimension of example 13, using Vegard's law, the cell dimension of nonexistent $Si_{9.5}S_4$ was calculated to be $a$=10.094 A Using this value and the actual value of 10.182 A for the cubic unit cell, the composition of the product was calculated to be $Si_{9.5}S_{1.4}Se_{2.6}$.

EXAMPLE 15

$Si_{9.5}S_{3.2}Se_{0.8}$

A pellet weighing 0.3645 g. was made from a mixture of Si, Se, and S, which were ground together in the atomic ratio 2:0.66:0.33, respectively. It was pressured to 65 kb. and reacted at 1,250° C. for 1 hour, cooled over a period of 3 hours to 1,100° C., and quenched. The product consisted of black microcrystals and reddish rodlike crystals, both of which were washed with 6N HCl, water, and acetone. The black microcrystals were identified from the Debye-Scherrer pattern as silicon. The reddish crystals showed a Debye-Scherrer pattern similar to that of $Si_{9.5}Se_4$ and was indexed on the basis of a cubic unit cell with $a$=10.121 A. Assuming the applicability of Vegard's rule in the manner described in example 14, the value of $x$ is 3.2, and the formula is $Si_{9.5}S_{3.2}Se_{0.8}$.

EXAMPLE 16

$Si_{9.5}S_{0.8}Te_{3.2}$

A pellet made from a mixture of 0.5616 g. of Si, 0.6385 g. of Te, and 0.160 g. of S was pressured to 65 kb. and reacted at 1,200° C for 2 hours, cooled over a period of 2 hours to 1,000° C. and quenched. The product consisted of black crystalline material at the ends of the pellet and larger red crystals toward the center. These were separated and washed with 6N HCl, water, and finally acetone. The Debye-Scherrer patterns of both regions showed a similarity to that of the phase $Si_{9.5}Te_4$. The pseudocubic unit cell dimension refined by the least squares technique was $a$=10.3767±0.0007 A. Chemical analysis showed S, 3.61 percent, indicating that the value of $x$ was approximately 0.8 and hence the formula $Si_{9.5}S_{0.8}Te_{3.2}$. Resistivity measurements on an individual crystal showed semiconductivity with Ea=0.5 ev. The material was mildly photoconductive with a ratio of dark to light resistance of 4.5.

EXAMPLE 17

$Si_{9.5}S_{1.4}Te_{2.6}$

A pellet weighing 0.3493 g. was pressed from a mixture of 0.144 g. of S, 0.1914 g. of Te, and 0.2808 g. of Si. It was pressured to 65 kb. and reacted at 1,200° C. for 2 hours, and quenched. The product consisted of a mixture of phases. Soluble material was removed by washing with 12 N HCl. The Debye-Scherrer pattern of the remainder showed the presence of excess Si and the $Si_{9.5}Te_4$-type phase. It could be indexed on the basis of a pseudocubic unit cell $a$=10.319 A. Using Vegard's rule, the value of $x$ is approximately 1.4, i.e., $Si_{9.5}S_{1.4}e_{2.6}$.

EXAMPLE 18

$Si_{9.5}S_xSe_yTe_z$

A pellet weighing 0.4084 g. was pressed from a mixture of 0.5617 g. of Si, 0.1069 g. of S, 0.4253 g. of Te, and 0.2632 g. of Se. It was pressured to 65 kb. and reacted at 1,200° C. for 2 hours, and quenched. The product contained several regions. Soluble material was washed out with 12N HCl. The remaining material showed a Debye-Scherrer pattern having the $Si_{9.5}Te_4$-type structure. The pattern was indexed on the basis of the pseudocubic cell $a$=10.282 A. X-ray fluorescence analysis confirmed the presence of all four elements in the phase.

Example A below shows that the products of this invention as typified by $Si_{9.5}Se_4$ and $Si_{9.5}Te_4$ are useful in detecting and measuring heat and infrared radiation.

EXAMPLE A

Crystalline samples of $Si_{9.5}Se_4$ (example 1) and $Si_{9.5}Te_4$ (example 6) were alternately utilized in a device to detect heat and infrared radiation. Each was placed in turn in a DC circuit in series with an ohm-meter. Heat from a soldering iron and light from an incandescent lamp, filtered to exclude short wavelength light and to pass infrared radiation, were in turn brought near to the crystals. The amount of heat from the soldering iron and infrared radiation from the lamp was detected by measuring the change in current flow with the ohm-meter. For $Si_{9.5}Se_4$, the resistance changed from $3\times10^{11}$ ohm-cm. to $2\times10^{11}$ ohm-cm. upon infrared irradiation and to $2\times10^{11}$ ohm-cm. with heat. For $Si_{9.5}Te_4$, the resistance changed from $6\times10^6$ ohm-cm. to $4\times10^6$ ohm-cm. in heat.

The silicon chalcogenides of this invention are also useful as semiconductors in a variety of other applications. They may be doped to impart $n$ and $p$ conductivity and used as rectifiers when reverse biased or as radiation emitters when forward biased. Electrical devices may be prepared by depositing active elements on substrates of the crystalline chalcogenides. Utility is greatly increased by the usual hydrolytic and thermal stability of the materials.

The embodiments of the invention in which an exclusive property or privilege is claimed are defined as follows:

1. Silicon chalcogenides of the formula $$Si_mS_xSe_yTe_z$$

wherein $m$ is 9.3±0.3, $x+y+z=4$, $x$ is 0 to 3.2, $y$ and $z$ are 0 to 4, said chalcogenides having a crystal structure of cubic symmetry when the chalcogen is Se or S/Se and a closely related crystal structure of pseudocubic symmetry when one of the chalcogens is Te.

2. The silicon chalcogenides of claim 1 wherein $m$ is 9.5.

3. The silicon chalcogenide of claim 2 wherein $x$ and $z$ are 0 and $y$ is 4; $Si_{9.5}Se_4$.

4. The silicon chalcogenide of claim 2 wherein $x$ and $y$ are 0 and $z$ is 4; $Si_{9.5}Te_4$.

5. The silicon dichalcogenide of claim 2 wherein $x$ is 0, $y$ is 1.44 and $z$ is 2.56; $Si_{9.5}Se_{1.44}Te_{2.56}$.

6. The silicon dichalcogenide of claim 2 wherein $x$ is 0, $y$ is 3.6 and $z$ is 0.4; $Si_{9.5}Se_{3.6}Te_{0.4}$.

7. The silicon dichalcogenide of claim 2 wherein $x$ is 1.68, $y$ is 2.32 and $z$ is 0; $Si_{9.5}S_{1.68}Se_{2.32}$.

8. The silicon dichalcogenide of claim 2 wherein $x$ is 1.4, $y$ is 2.6 and $z$ is 0; $Si_{9.5}S_{1.4}Se_{2.6}$.

9. The silicon dichalcogenide of claim 2 wherein $x$ is 3.2, $y$ is 0.8 and $z$ is 0; $Si_{9.5}S_{3.2}Se_{0.8}$.

10. The silicon dichalcogenide of claim 2 wherein $x$ is 0.8, $y$ is 0 and $z$ is 3.2; $Si_{9.5}S_{0.8}Te_{3.2}$.

11. The silicon dichalcogenide of claim 2 wherein $x$ is 1.4, $y$ is 0 and $z$ is 2.6; $Si_{9.5}S_{1.4}Te_{2.6}$.